United States Patent
Poberezhskiy et al.

(10) Patent No.: US 11,664,837 B2
(45) Date of Patent: May 30, 2023

(54) MITIGATING STRONG NON-GAUSSIAN INTERFERENCE IN SS RECEIVERS

(71) Applicant: Raytheon Company, Waltham, MA (US)

(72) Inventors: Gennady Y. Poberezhskiy, Hermosa Beach, CA (US); Antoine J. Rouphael, Escondido, CA (US); Phillip M. Izdebski, Buena Park, CA (US); Allison Y. Pern, Monterey Park, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/398,730

(22) Filed: Aug. 10, 2021

(65) Prior Publication Data

US 2022/0329275 A1 Oct. 13, 2022

Related U.S. Application Data

(60) Provisional application No. 63/171,882, filed on Apr. 7, 2021.

(51) Int. Cl.
*H04B 1/12* (2006.01)

(52) U.S. Cl.
CPC ..................... *H04B 1/12* (2013.01)

(58) Field of Classification Search
CPC ....................................................... H04B 1/12
See application file for complete search history.

(56) References Cited

U.S. PATENT DOCUMENTS

| 7,912,158 | B2 | 3/2011 | Cahn et al. |
| 9,197,360 | B2 | 11/2015 | Wyckoff |
| 9,391,654 | B2 | 7/2016 | Wyckoff et al. |
| 9,632,183 | B2 | 4/2017 | Zehnpfennig et al. |
| 10,574,288 | B2 | 2/2020 | Dafesh et al. |
| 2007/0237215 | A1* | 10/2007 | Sartor ..................... G06T 5/003 375/224 |

(Continued)

OTHER PUBLICATIONS

Amoroso, Frank, et al., "Adaptive A/D Converter for Improved DS/SS Jam Resistance", IEEE Trans. Aerosp. Electron. Syst., vol. 34, No. 3, (Jul. 1998), 810-816.

(Continued)

*Primary Examiner* — Junpeng Chen
(74) *Attorney, Agent, or Firm* — Schwegman Lundberg & Woessner, P.A.

(57) ABSTRACT

Systems, devices, methods, and computer-readable media for spread spectrum (SS) receiver interference mitigation are presented. An interference mitigation unit can include an interference analyzer that receives a complex-valued signal and estimates statistical characteristics of at least a portion of the complex-valued signal, a unit controller that receives the estimated statistical characteristics from the interference analyzer, classifies the interference distribution based on statistical characteristics as a Gaussian, long-tail, or short-tail, selects a non-linearity for that distribution, and a programmable non-linear module that performs a non-linear functional conversion of an envelope of the received complex-valued signal using a non-linear input-output characteristic based on the classification by the unit controller.

20 Claims, 12 Drawing Sheets

(56) References Cited

U.S. PATENT DOCUMENTS

| | | | |
|---|---|---|---|
| 2014/0324339 A1* | 10/2014 | Adam | G01S 13/726 701/519 |
| 2018/0046933 A1* | 2/2018 | La Cour | G06F 12/023 |
| 2021/0036727 A1* | 2/2021 | Kilian | H04B 1/1027 |

OTHER PUBLICATIONS

Baier, P W, et al., "A Nonlinear Device to Suppress Strong Interfering Signals with Arbitrary Angle Modulation in Spread-Spectrum Receivers", IEEE Trans. Commun., vol. 33, No. 3, (Mar. 1985), 300-302.

Borio, Daniele, et al., "Robust transform domain signal processing for GNSS", Navigation, vol. 66, No. 2, (Summer 2019), 305-323.

Capon, J, "On the Asymptotic Efficiency of Locally Optimum Detectors", IEEE Trans. Inf. Theory, vol. 7, No. 2, (Apr. 1961), 67-71.

Kassam, S A, et al., "Robust Techniques for Signal Processing: A Survey", Proc. IEEE, vol. 73, No. 3, (Mar. 1985), 433-481.

Kozlov, D G, et al., "Minimax Discrimination of Bipolar Signals", Radio Eng. Electron. Phys., vol. 35, No. 12, pp. 39-46, (1990), 10 pgs.

Modestino, J W, et al., "Detection of Weak Signals in Narrowband Non-Gaussian Noise", IEEE Trans. Inf. Theory, vol. 25, No. 5, (Sep. 1979), 592-600.

Poberezhskiy, Y S, et al., "On Adaptive Robustness Approach to Anti-Jam Signal Processing", Proc. IEEE Aerosp. Conf., (Mar. 2013), 1-20.

"International Application Serial No. PCT/US2022/023658, International Search Report dated Jul. 25, 2022", 4 pgs.

"International Application Serial No. PCT/US2022/023658, Written Opinion dated Jul. 25, 2022", 6 pgs.

Aazhang, Behnaam, et al., "Nonqaussian Effects in DS/SSMA Communications", Military Communications Conference, 1984. Milcom 1984. IEEE, IEEE, Piscataway, NJ, USA, (Oct. 21, 1984), 509-514.

Domanski, Pawel D, "Study on Statistical Outlier Detection and Labelling", International Journal of Automation and Computing, Zhongguo Kexue Zazhishe, CN, vol. 17, No. 6, (Oct. 21, 2020), 788-811.

Jones, Rasmus T, et al., "Prediction of Second-Order Moments of Inter-Channel Interference with Principal Component Analysis and Neural Networks", 2017 European Conference on Optical Communication (ECOC), IEEE, (Sep. 17, 2017), 1-3.

Yu, Shujian, et al., "Generalized Kernel Normalized Mixed-Norm Algorithm: Analysis and Simulations", 18th International Conference, Austin, TX, USA, Sep. 24-27, 2015; [Lecture Notes In Computer Science; Lect. Notes Computer], Springer, Berlin, Heidelberg, (Nov. 10, 2015), 61-70.

"International Application Serial No. PCT US2022 023658, Written Opinion dated Jul. 25, 22", 6 pgs.

Aazhang, Behnaam, "Nonqaussian Effects in DS SSMA Communications", Military Communications Conference, 1984. Milcom 1984. IEEE, IEEE, Piscataway, NJ, USA, (Oct. 21, 1984), 509-514.

Jones, Rasmus T, "Prediction of Second-Order Moments of Inter-Channel Interference with Principal Component Analysis and Neural Networks", 2017 European Conference on Optical Communication (ECOC), IEEE, (Sep. 17, 2017), 1-3.

Yu, Shujian, "Generalized Kernel Normalized Mixed-Norm Algorithm: Analysis and Simulations", 18th International Conference, Austin, TX, USA, Sep. 24-27, 2015; [Lecture Notes In Computer Science; Lect. Notes Computer], Springer, Berlin, Heidelberg, (Nov. 10, 2015), 61-70.

* cited by examiner

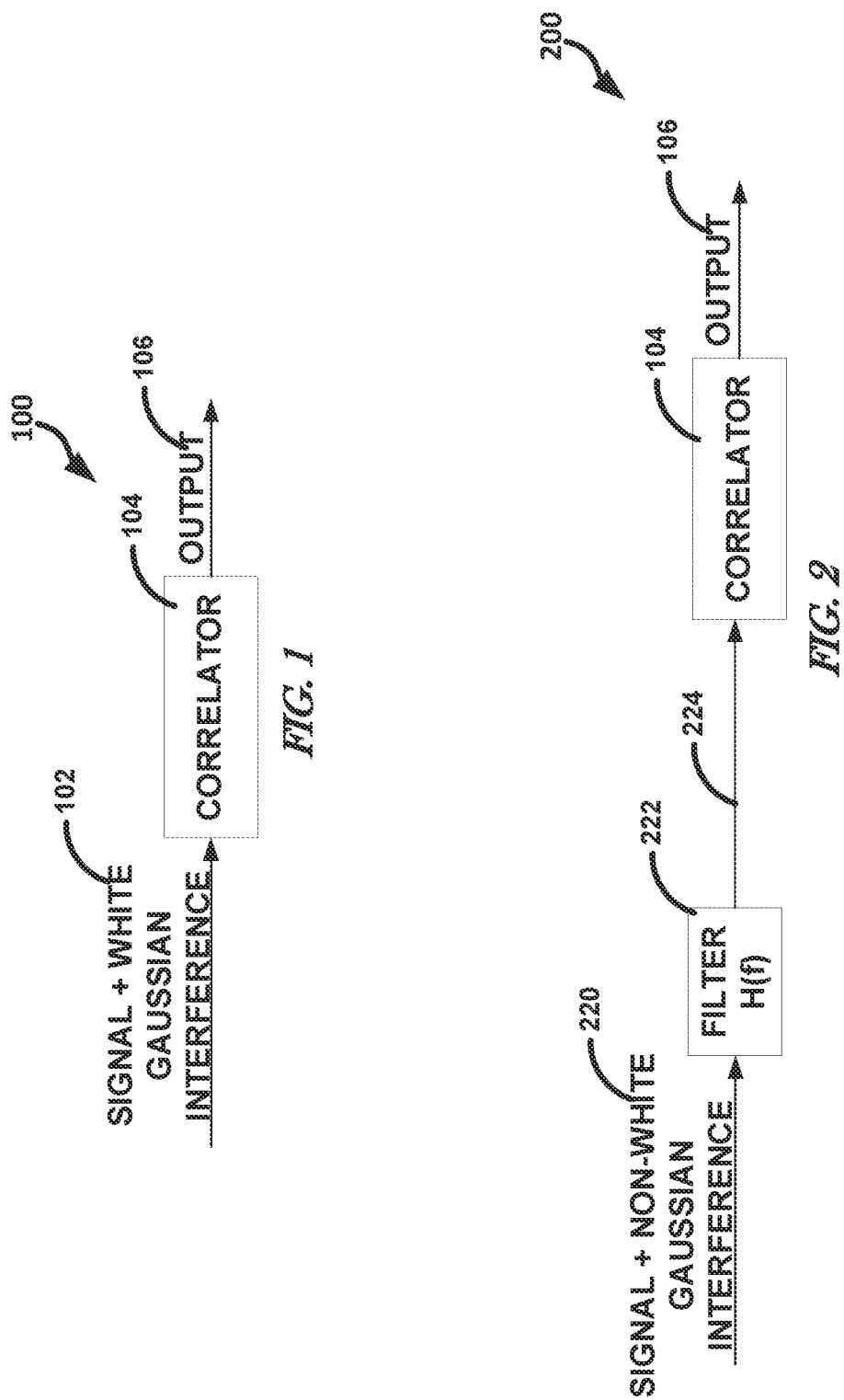

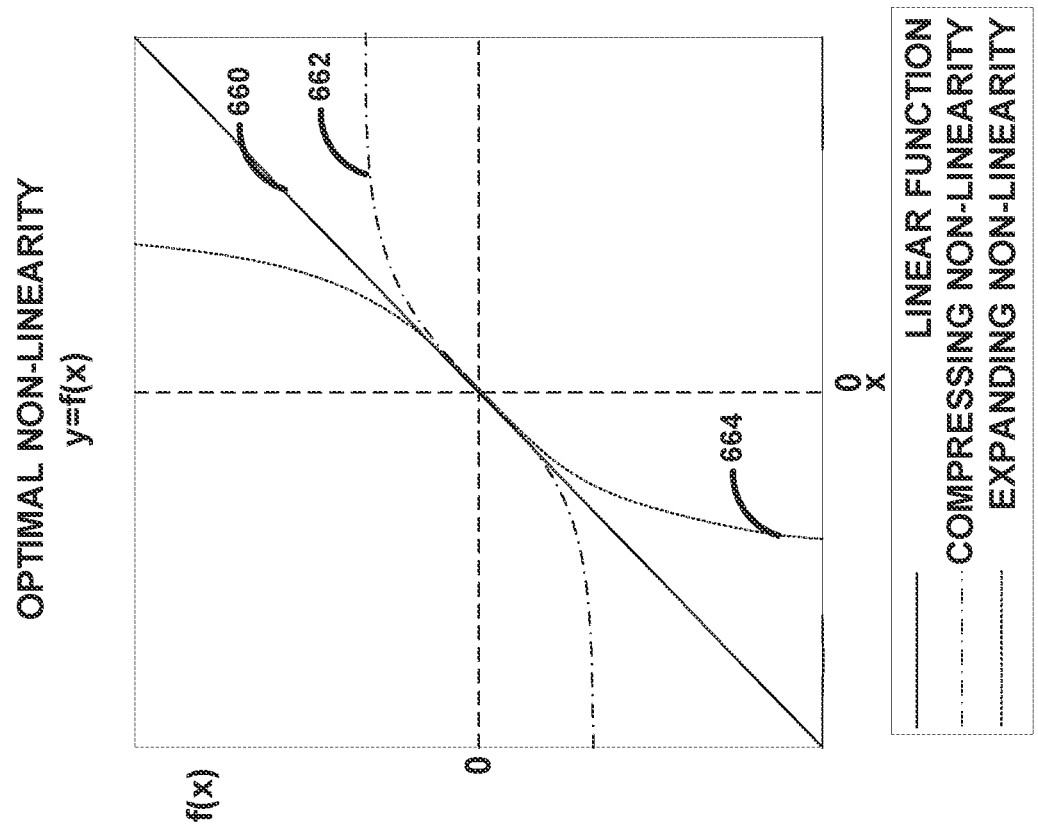
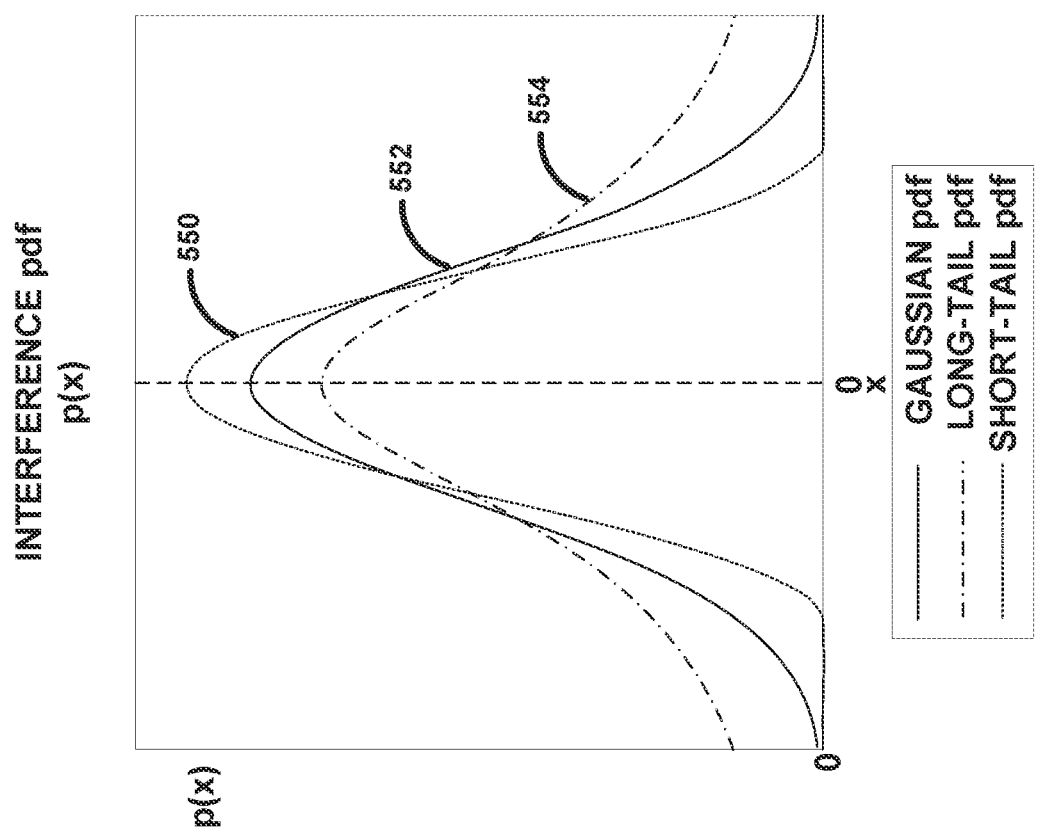
FIG. 6
FIG. 5

US 11,664,837 B2

MITIGATING STRONG NON-GAUSSIAN INTERFERENCE IN SS RECEIVERS

RELATED APPLICATION

This application claims benefit of priority to U.S. Provisional Patent Application No. 63/171,882 titled "Mitigating Strong NonGaussian Interference in SS Receivers" and filed on Apr. 7, 2021, which is incorporated by reference herein in its entirety.

SUMMARY

An apparatus implements a method for mitigation of strong non-Gaussian interference in spread spectrum (SS) receivers using non-linear processing are described. The method combines robust and adaptive processing and is effective against non-Gaussian and narrowband Gaussian interference. The apparatus can include an interference analyzer. The apparatus can include a probability distribution function (pdf) shaping filter that modifies the pdf of interference samples in a way suitable for mitigation. The apparatus can include a block that performs non-linear functional conversion. The non-linear processing can be combined with additional interference mitigation methods in spatial, frequency, and other domains. The apparatus can work as a standalone interference mitigation unit compatible with various receivers or as a subsystem of a particular receiver.

BACKGROUND

SS signals are broadly used in various types of electronic systems, including navigation, communication, radar, sonar, etc. An SS signal is formed by taking a signal (e.g., an electrical, electromagnetic, or acoustic signal) generated with a particular bandwidth and spreading the signal in the frequency domain. The result is a signal with a wider frequency bandwidth. SS techniques are used for a variety of reasons, including increased resistance to some types of interference, reduced probability of detection by a third party, code division multiple access (CDMA), and multipath mitigation, among others.

BRIEF DESCRIPTION OF DRAWINGS

FIG. 1 illustrates a mitigation system for white Gaussian interference.

FIG. 2 illustrates a mitigation system for non-white Gaussian interference.

FIG. 5 illustrates some example pdfs of interference.

FIG. 6 illustrates some example optimal non-linearities that can be applied to mitigate interference with pdfs of FIG. 5.

DETAILED DESCRIPTION

Figure 3:
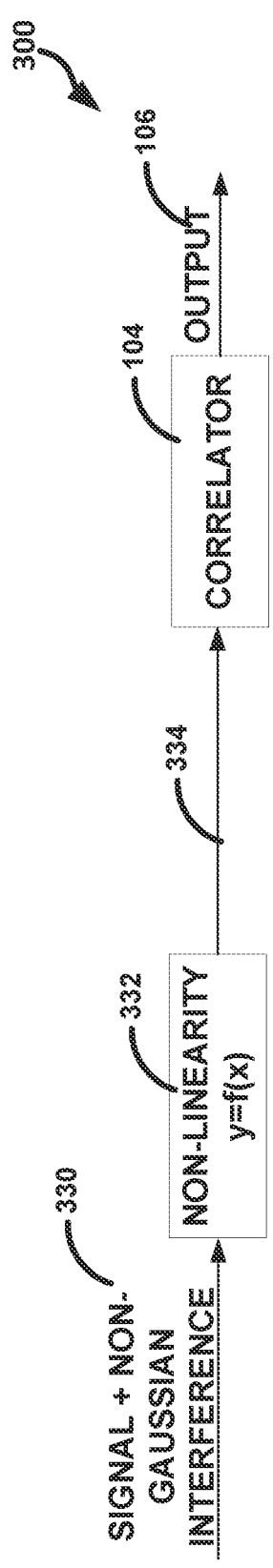
FIG. 3 illustrates a mitigation system for white non-Gaussian interference.

The following description and the drawings sufficiently illustrate teachings to enable those skilled in the art to practice them. Other embodiments may incorporate structural, logical, electrical, process, and other changes. Portions and features of some examples may be included in, or substituted for, those of other examples. Teachings set forth in the claims encompass all available equivalents of those claims.

Teachings regard handling of initially processed complex-valued baseband input signal in an SS receiver. The input signal contains the desired signal(s), receiver noise, and external interference. In scenarios considered herein, the external interference is the dominant component of the input signal, so that the estimated spectral and statistical characteristics of the input signal, before a correlator, can be considered good approximations of the corresponding characteristics of the interference.

Receivers may experience many types of non-intentional and intentional interference that may have Gaussian or other, non-Gaussian distribution. Optimal detection of signals in Gaussian interference involves linear operations. In receivers, linear operations can be performed by correlators or matched filters, typically preceded by other linear blocks including filters.

Detection of signals in non-Gaussian interference generally involves non-linear conversion followed by correlators or matched filters. Parameters of the non-linearity are determined by the statistical characteristics of the interference. For example, optimal N-sample processing of real-valued input signal samples $u_n$ in presence of non-Gaussian interference whose samples can be considered independent with probability density function (pdf) p(x) is $$S = \sum_{n=1}^{N} f(u_n) s_n \quad (1)$$

where θ(x) is the optimal non-linearity corresponding to p(x), and $s_n$ are samples of the replica signal generated in the receiver. This equation translates into a structure consisting of non-linear functional conversion block followed by a correlator or matched filter.

For very strong interference whose power significantly exceeds signal power, the optimal θ(x) can be found from the pdf p(x) and its derivative p'(x) as described, for example, in J. Capon, "On the Asymptotic Efficiency of Locally Optimum Detectors," *IEEE Trans. Inf. Theory*, vol. 7, no. 2, April 1961, pp 67-71. In fact, p(x) is the pdf of the sum of interference and receiver noise, but here it is referred to as "interference pdf" for brevity since interference is the dominant component of that sum.

For complex-valued baseband samples $u_n$ in presence of non-Gaussian interference, the detection theory under the same assumptions leads to optimal processing equation (2)

$$S = \sum_{n=1}^{N} \frac{f_{env}(|u_n|)}{|u_n|} u_n s_n^* = \sum_{n=1}^{N} f_{env}(|u_n|) \exp[i \text{ phase}(u_n)] s_n^* \qquad (2)$$

where $f_{env}(x)$ is the optimal non-linearity and $s_n^*$ are complex-conjugate samples of the replica signal generated in the receiver. Equation (2) translates into applying the non-linearity $f_{env}(x)$ to the magnitudes of the complex-valued input samples (to the envelope of the complex-valued baseband signal) before a correlator or matched filter. In this case, the optimal $f_{env}(x)$ can be found from the pdf $p_{env}(x)$ of the input signal envelope and its derivative $p_{env}'(x)$ as described, for example, in J. W. Modestino and A. Y. Ningo, "Detection of Weak Signals in Narrowband Non-Gaussian Noise," *IEEE Trans. Inf. Theory*, vol. 25, no. 5, September 1979, pp 592-600.

In some cases, the optimal non-linearity can be implemented in the receiver. In other cases, implementation of the optimal non-linearity is not practical. For example, the optimal non-linearity may not be robust. Not robust in this instance means the performance of the receiver significantly degrades if the actual interference pdf slightly deviates from the nominal (expected or estimated) one.

The optimal non-linearity may also be problematic to implement, such as if it consumes a large output bandwidth. In such cases, it is beneficial to use a similar non-linear function that is more robust and/or easier to implement, at the cost of slightly less than optimal performance for the nominal interference pdf. Robust non-linearities for various classes of interference distributions are described, for example, in S. A. Kassam and H. V. Poor, "Robust Techniques for Signal Processing: A Survey," *Proc. IEEE*, vol. 73, no. 3, March 1985, pp. 433-481. Increased robustness of non-linear signal processing can include less adaptation and vice versa.

For a long-tail interference pdf, an optimal or robust near-optimal non-linearity typically contains compressing and/or limiting segments that reduce the dynamic range of the output samples compared to that of input samples. For a short-tail interference pdf, an optimal or robust near-optimal non-linearity typically contains expanding segments that increase the dynamic range of the output samples compared to that of input samples.

In practice, an interference mitigation apparatus using non-linear signal processing includes one or more of several qualities:

Near-optimal anti-interference performance.
Robustness (ability to handle deviations of the interference pdf from the estimated or expected one).
Sufficiently accurate estimation of statistical characteristics of interference.
Sufficiently low complexity and cost, which necessitate reasonable simplicity of implementation and manageable output dynamic range.
Combining these qualities can be problematic, especially for some short-tail interference distributions, for which the expanding non-linearity often dictates very high output dynamic range.

Solutions to the interference mitigation can include analytical solutions derived from detection theory or empirical solutions. The analytical solutions typically have optimal or near-optimal performance but are often impractical for implementation due to high complexity and cost. The analytical solutions often have very high output dynamic range. The empirical solutions are simpler and more practical than analytical ones but their performance can be far from optimal for many types of interference. Therefore, there is a need for a versatile interference mitigation means that combines optimal or near-optimal performance with high practicality of implementation.

The initial processing of the input signal in an SS receiver includes downconversion to baseband. It may also include preliminary filtering, decimation, and various types of interference mitigation in spatial, frequency, polarization, and other domains. SS systems generally make use of a sequential noise-like signal structure to spread an information signal over a wider frequency band. The receiver correlates the received signals to retrieve the original information contained in the desired signal(s).

In some systems, the receiver is considered to be a part of a SS system that uses both frequency division multiple access (FDMA) and code division multiple access (CDMA). In such a system, direct sequence SS signals from many sources can be transmitted over several adjacent frequency channels, and multiple signals using different pseudorandom codes can be transmitted over each frequency channel. A number of communication, navigation, and other systems fit this description. The teachings are also applicable to SS systems using only CDMA, only FDMA, or neither CDMA nor FDMA.

The teachings can include a pdf shaping filter in each FDMA frequency channel. One purpose of this filter is to alter the pdf of wideband interference in the frequency channel in a way most suitable for interference mitigation. Another purpose of this filter is further separation of the signals in the frequency channel from signals, noise, and interference in other frequency channels. The coefficients of the filter can be constant or programmable.

The teachings can include an interference analyzer that estimates statistical and spectral characteristics of the interference. These characteristics can include variance, kurtosis or its approximation, histogram, critical points, or a combination thereof of the pdf of interference or its envelope. Knowledge of some or all of these characteristics can be used to determine whether the interference pdf can be classified as Gaussian, long-tail, or a short-tail pdf. Knowledge of some of all of these characteristics can be used to determine whether the interference can be classified as narrowband. This classification along with the quantitative characteristics mentioned above can be used to select a suitable non-linearity for mitigating the interference. Additional or alternative to an interference analyzer applied to the signals in separate FDMA frequency channels, some teachings can include an interference analyzer block applied before the separation of the input signal into frequency channels.

The teachings can include a non-linear module that performs a non-linear transformation on the envelope of an input signal in each FDMA frequency channel before the separation of code channels. The non-linear input-output function $y=f_{env}(x)$ can be chosen based on the statistical and possibly spectral characteristics of the interference estimated by the interference analyzer module. The non-linear input-output function can be an approximation of the optimal non-linearity calculated in real time, for example, according to Equation 2. The non-linear input-output function can also be an approximation of a suitable near-optimal robust non-linearity selected and scaled in real time based on the statistical characteristics of the interference estimated by the interference analyzer block. To maintain a manageable output dynamic range, a non-linearity can be modified in a piece-wise manner by introducing additional discontinuities at suitable points. The piece-wise alteration can be akin to how a Fresnel lens uses a flattened structure to emulate a curved surface. Performed properly, such modification allows for better output dynamic range management than would be used for mitigating certain interference types, leading to reduced complexity and cost of the receiver. In addition, or alternative to non-linear modules applied to the signals in separate FDMA frequency channels, some teachings can include a non-linear block applied before the separation of the input signal into frequency channels.

The operations, functions, or techniques described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on a digital signal processor, application specific integrated circuitry (ASIC), microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, FPGAs, ASICs, or the like).

FIGS. 1-4 illustrate respective general techniques for mitigating interference in a receiver. FIG. 1 illustrates a mitigation system 100 for white Gaussian interference. The mitigation system 100 includes a correlator 104 that receives the sum of a desired signal with white Gaussian interference 102. Information symbols 106 of the desired signal are recovered by the correlator 104. The correlator 104 (and other correlators herein) operate by performing a multiplication of input by a known replica code sequence, with subsequent integration. The result of the integration are the information symbols 106.

FIG. 2 illustrates a mitigation system 200 for non-white Gaussian interference. The system 200 includes a filter 222 that modifies the spectra of interference and desired signal 220 in a way optimal for subsequent processing in a correlator 104 (or matched filter). The modified signal 224 can be provided as input to the correlator 104 to recover the information symbols 106. FIGS. 1 and 2 illustrate that optimal pre-correlation processing for Gaussian interference is linear.

FIG. 3 illustrates a mitigation system 300 for white non-Gaussian interference. The system 300 includes a non-linear block 332 that alters a signal with non-Gaussian interference 330 in a non-linear manner. The resulting non-linearly adjusted signal 334 is provided to the correlator 104, which extracts the symbols 106.

Figure 4:
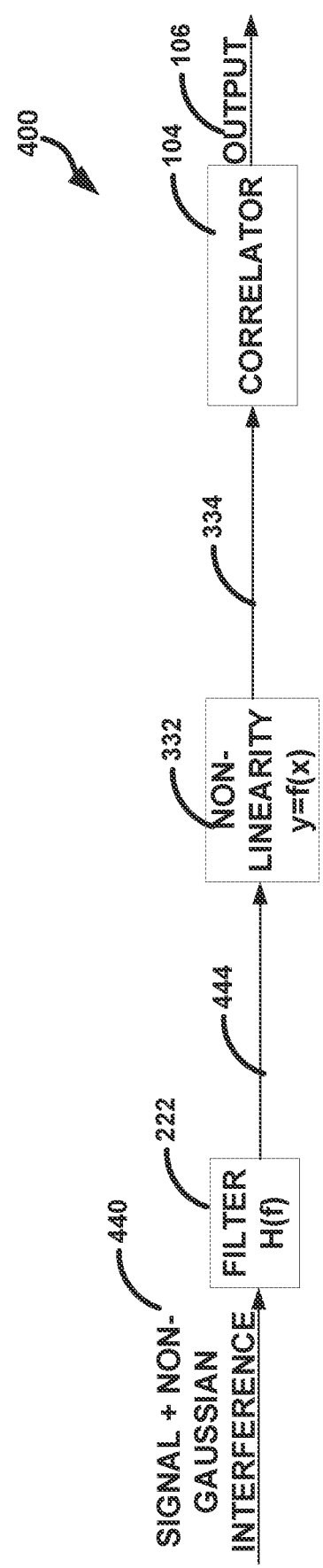
FIG. 4 illustrates a mitigation system for non-white non-Gaussian interference.

FIG. 4 illustrates a mitigation system 400 for non-white non-Gaussian interference. In FIG. 4, a signal with non-Gaussian interference 440 is first filtered by the filter 222. The resulting signal 444 is operated on by the non-linear block 332 to generate the non-linearly adjusted signal 334. The correlator 104 then operates on the non-linearly adjusted signal 334 to produce the symbols 106.

FIG. 5 illustrates some example pdfs of real-valued interference. A Gaussian pdf 552, a short-tail pdf 550, and a long-tail pdf 554 are illustrated in FIG. 5. The short-tail pdf 550 has tails that are smaller than those of the Gaussian pdf 552 and the long-tail pdf 554 has tails that are longer than those of the Gaussian pdf 552.

FIG. 6 illustrates some example optimal non-linear functions that can be used in non-linear block 332 in FIGS. 3 and 4 to mitigate interference with pdfs of FIG. 5 by improving the signal-to-noise ratio (SNR) at the output of the non-linear block. Optimal pre-correlation processing for Gaussian interference is linear as again illustrated in FIG. 6.

Examples of interference with long-tail pdf include pulsed interference. Interference with a long-tail pdf typically can be mitigated with a non-linearity that is compressing or has compressing segments. A conceptual example of compressing non-linearity 662 is illustrated in FIG. 6. The output dynamic range of a compressive non-linearity is lower than its input dynamic range, which makes the complexity and cost of adding a non-linear block manageable.

Examples of interference with short-tail pdf include interference with truncated Gaussian, truncated generalized Gaussian, and truncated Cauchy distributions. They also include interference with low peak-to-average power ratio (PAPR) such as continuous wave (CW) interference, swept CW interference (also called LFM or chirp interference), and low-PAPR matched spectrum interference. Interference with short-tail pdf typically can be mitigated with a non-linearity that is expanding or has expanding segments. A conceptual example of expanding non-linearity 664 is illustrated in FIG. 6. The output dynamic range of an expanding non-linearity can be much higher than its input dynamic range, which can make the complexity and cost of adding a non-linear block very high.

For improved interference mitigation in complex-valued baseband signal, the non-linearity can be applied to the input signal envelope. In many cases, it is beneficial to use a similar, near-optimal interference mitigation that is more robust and/or easier to implement, at the cost of slightly less than optimal performance for the nominal interference pdf.

Figure 7A:
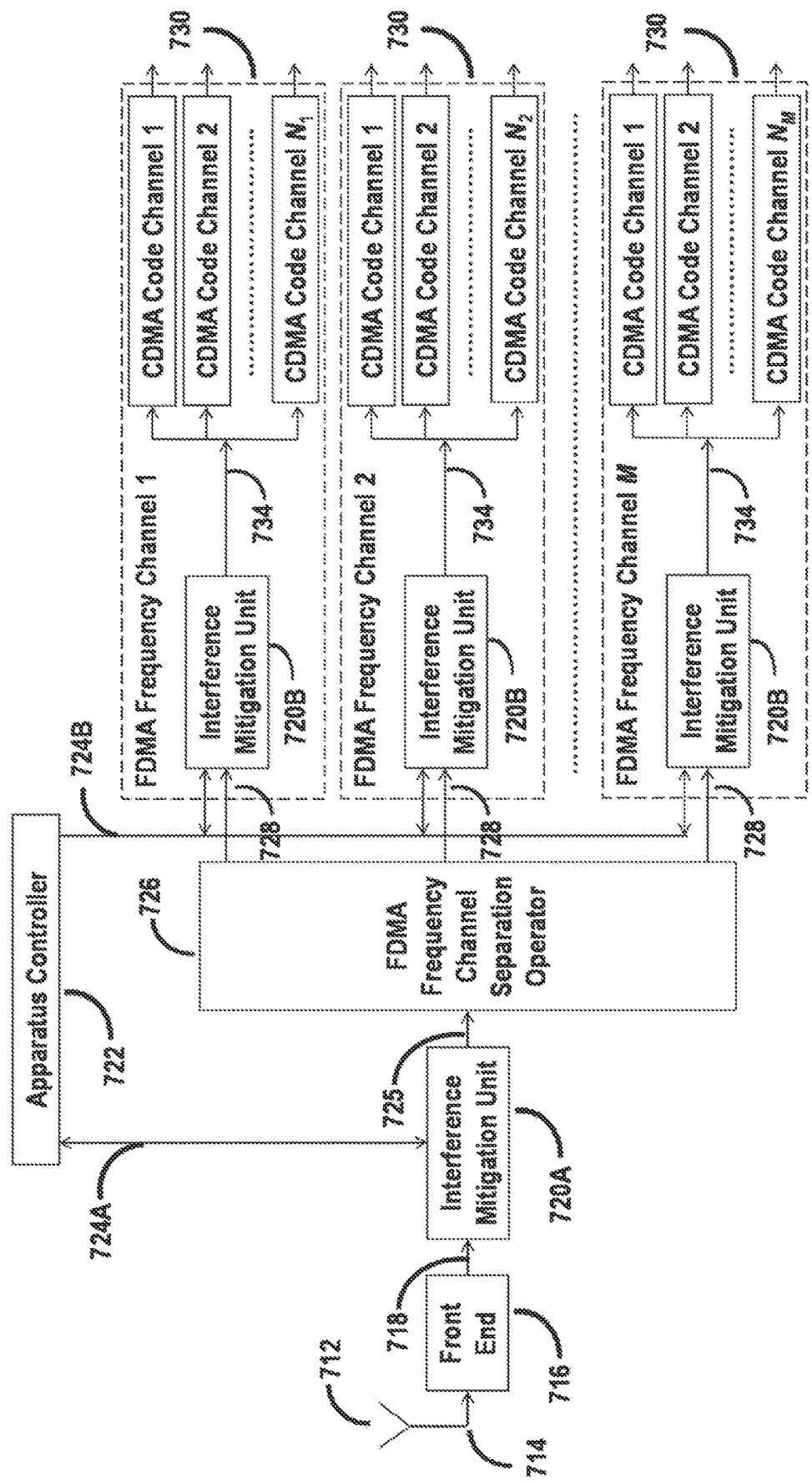
FIG. 7A illustrates, by way of example, a diagram of an interference mitigation apparatus integrated with an SS receiver.

FIG. 7A illustrates, by way of example, a diagram of an interference mitigation apparatus integrated in a receiver of FDMA and CDMA SS signals. The system of FIG. 7A includes an antenna 712, a front end 714, an interference mitigation unit 720A, an apparatus controller 722, an FDMA frequency channel separation module 726, FDMA frequency channels 730, and CDMA code channels.

The antenna 712 can include any sensor or set of sensors for reception of the desired SS signal(s) and converting them to electrical signals. If a set of sensors (e.g., antenna array) is used, antenna 712 can include a device combining the signals from the sensors' outputs into one electrical signal. Electrical signal 714 from antenna 712 is a sum of desired signal(s), receiver noise, and interference. Front end 716 performs downconversion, digitization, preliminary filtering, or other preliminary processing of signal 714, converting it to a baseband complex-valued digital signal 718 containing a sum of desired signal(s), receiver noise, and interference. Front end 716 can include one or more blocks performing interference mitigation in spatial, frequency, or other domains.

Baseband complex-valued signal 718 can be processed by an optional interference mitigation unit 720A (common for all FDMA channels). An output signal 725 of the interference mitigation unit 720A can be divided into FDMA channel signals 728 by the FDMA frequency channel separation block 726. This separation can include downconversion and possibly decimation (with decimation filtering) of signal in each frequency channel.

In each FDMA frequency channel 730, channel signal 728 enters the channel interference mitigation unit 720B. A signal 734 from the interference mitigation unit 720B is sent to the inputs of all CDMA code channels associated with the given frequency channel. Each CDMA code channel can include Doppler a shift compensation block, a correlator for data demodulation and/or carrier tracking, and a number of auxiliary correlators for code and carrier tracking. Note that the CDMA code channels do not constitute a part of the interference mitigation apparatus.

In some teachings, the interference mitigation apparatus may include only the common interference mitigation unit 720A, only the channel interference mitigation units 720B in all FDMA frequency channels, only the channel interference mitigation units 720B in some FDMA frequency channels, or a combination thereof. In the teachings for which the apparatus includes the common interference mitigation unit 720A as well as the channel interference mitigation units 720B in FDMA frequency channels, operation of the units can be coordinated by the apparatus controller 722. The apparatus controller can enable interference mitigation only in the common unit 720A, only in the channel units 720B, or in a combination thereof. This decision can be based on the information about the interference obtained in the common interference mitigation unit 720A and the channel interference mitigation units 720B and sent to the controller through bi-directional buses 724A and 724B, respectively.

An example of interference that may be easier to mitigate in the common interference mitigation unit 720A is a wideband low-PAPR interference whose spectrum covers all or most FDMA frequency channels. On the other hand, if interference signals in different frequency channels have different probability distributions and powers, they may be easier to mitigate in the channel interference mitigation units 720B.

Figure 7B:
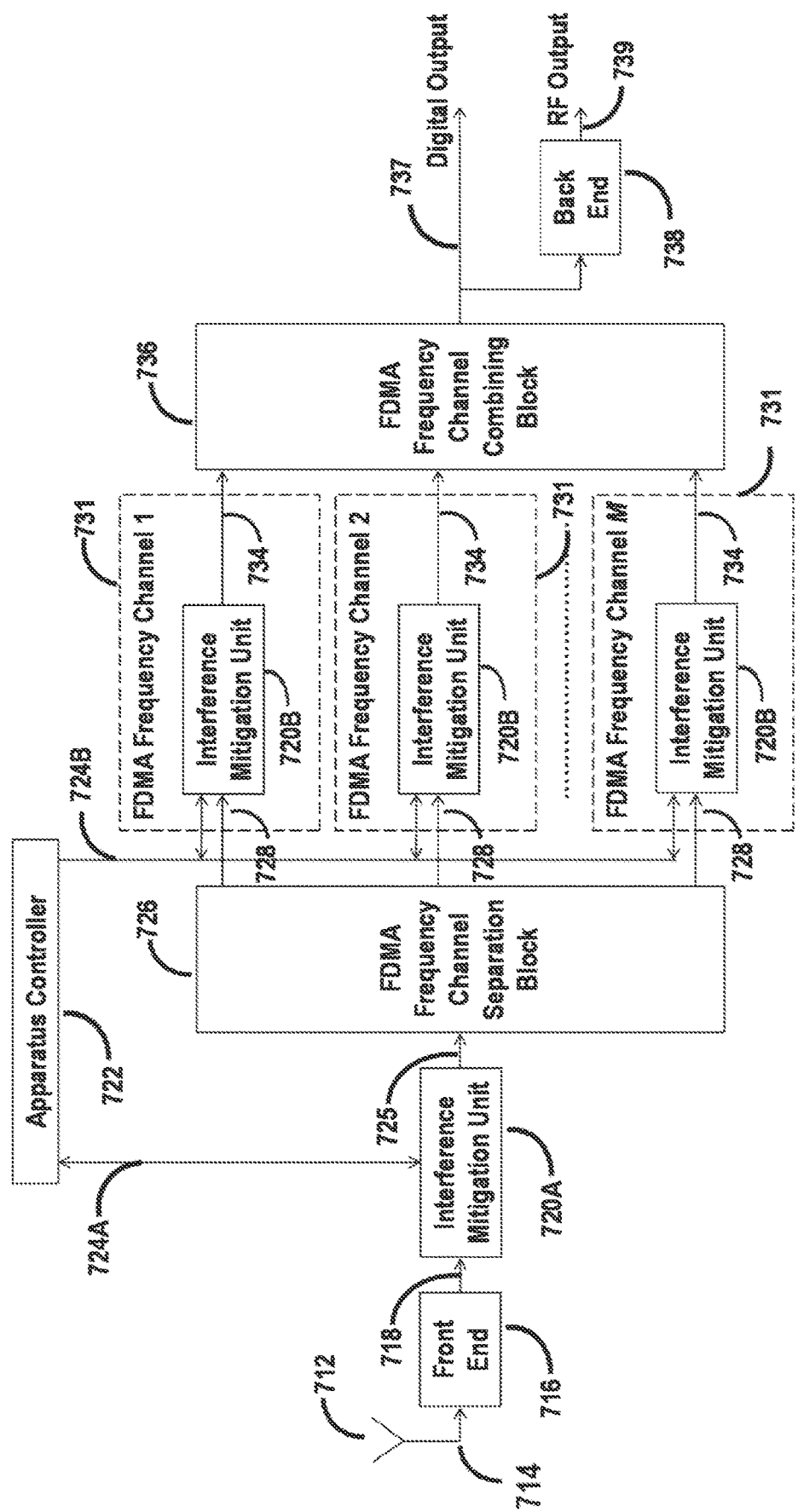
FIG. 7B illustrates, by way of example, a diagram of a standalone interference mitigation apparatus.

FIG. 7B illustrates, by way of example, a diagram of a standalone interference mitigation apparatus. The apparatus of FIG. 7B can be coupled to various receivers of FDMA and/or CDMA SS signals. The components from antenna 712 to channel interference mitigation units 720B are the same as in the apparatus in FIG. 7A. However, signals 734 in FIG. 7B, unlike those in FIG. 7A, are not sent to CDMA code channels. Instead, they are sent to FDMA frequency channel combining block 736, which combines signals 734 into a common complex-valued digital baseband signal 737. If the input signal 714 contains strong non-Gaussian interference, signal 737 has higher SNR than signal 714. Signal 737 is sent to the digital output of the apparatus, which can be connected to a compatible digital input of an SS receiver. Besides that, digital baseband signal 737 can be converted to RF signal 739 in an optional back end 738. Signal 739 is sent to the RF output of the apparatus, which can be connected to an RF input of an SS receiver. This allows using the apparatus even with SS receivers that have no compatible digital inputs.

Figure 7C:
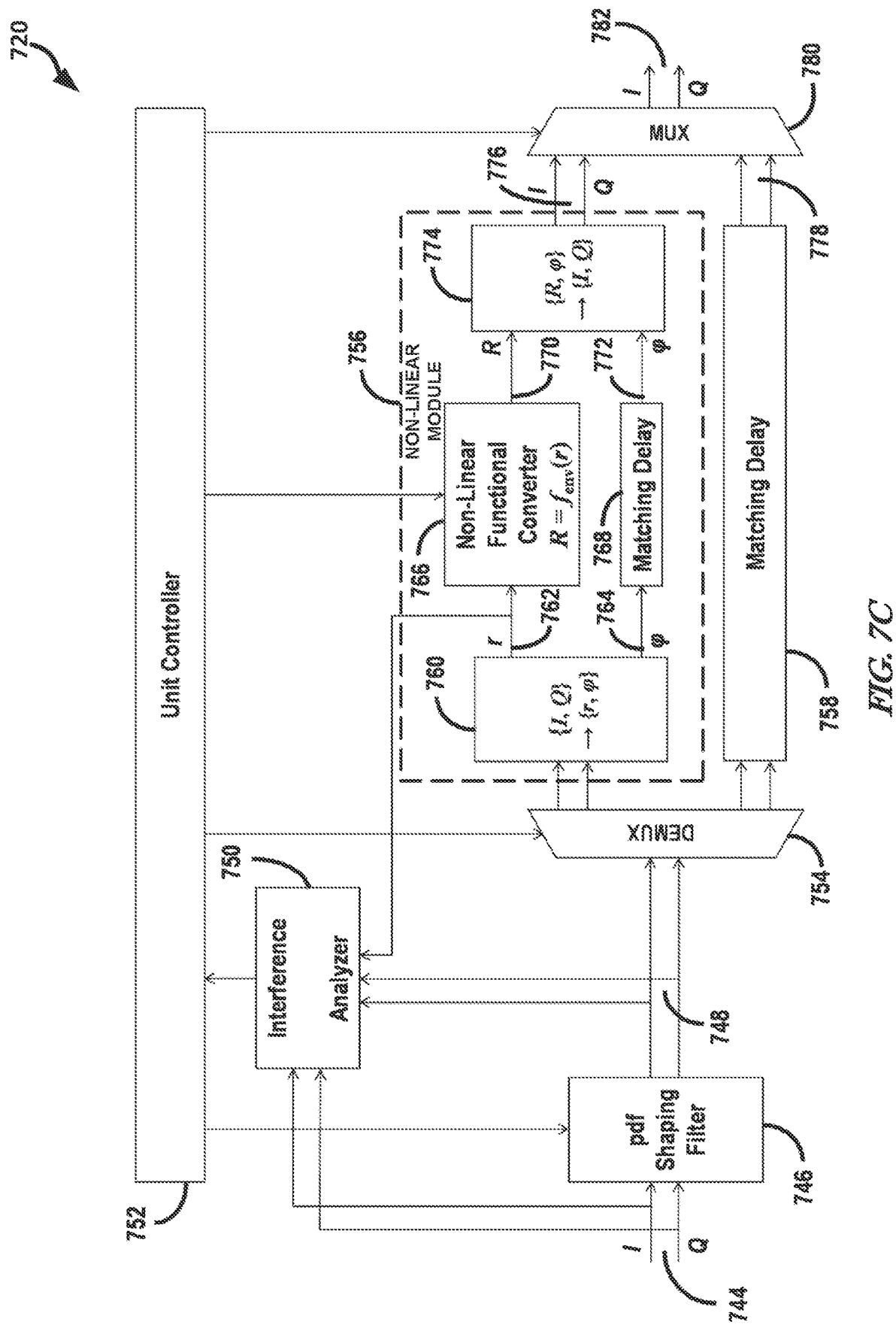
FIG. 7C illustrates, by way of example, a diagram of an interference mitigation unit, which is the main functional block of interference mitigation apparatus.

FIG. 7C illustrates, by way of example, a diagram of an interference mitigation unit, such as the interference mitigation unit 720A or 720B. The unit is controlled by the unit controller 752 which receives the information from the unit's interference analyzer block 750. The unit controller 752 can receive information and instructions from the apparatus controller 722 or other higher-level controllers and/or processors in the receiver. Based on the received information, the unit controller 752 makes decisions that control demultiplexer 754, non-linear module 756, and multiplexer 780 of the interference mitigation unit. It may also control pdf shaping filter 746 if the filter has programmable coefficients.

Complex-valued baseband signal 744 entering the unit can be passed through pdf shaping filter 746. Signal 748 from the output of the filter 746 can be provided to a demultiplexer 754. The demultiplexer 754, together with multiplexer 780, can route the signal 744 either through non-linear module 756 or around the non-linear module 756 through a matching delay module 758. The latter route allows saving power and can be used if the interference component of signal 748 is sufficiently small or its mitigation in non-linear block 756 is not beneficial. Matching delay 758 helps ensure that the signal delay in the interference mitigation unit stays the same independently of the signal 744 routing.

Non-linear block 756 as illustrated includes a format converter 760 that converts the signal from quadrature format $\{I, Q\}$ to magnitude-phase format $\{r, \varphi\}$. The non-linear block 756 as illustrated includes a non-linear functional converter 766 that performs non-linear conversion $R = f_{env}(r)$ of magnitude samples 762. The non-linear block 756 as illustrated includes a matching delay block 768 (whose delay is equal to the group delay of the non-linear functional converter 766) for phase samples 768. The non-linear module 756 as illustrated includes a format converter 774 that converts the signal from magnitude-phase format $\{R, \varphi\}$ to quadrature format $\{I, Q\}$.

Two purposes of pdf shaping filter 746 are shaping the interference pdf in a way most suitable for mitigation in non-linear block 756 as described below, as well as further spectral isolation of the frequency channel signal from signals and interference in the neighboring frequency channels. The filter coefficients can be either fixed or programmable. In the latter case, the coefficients are programmed by the unit controller 752, which selects the most suitable set of coefficients based on the information about the interference, which the unit controller 752 can receive from the interference analyzer 750. In some teachings, the pdf shaping filter 746 can be a part of the FDMA channel separation module 726 rather than the interference mitigation unit. This can be beneficial, such as when the filter 746 is combined with the decimation filter of the FDMA channel separation block 726.

Filtering interference during and after FDMA frequency channel separation can alter the interference pdf within the channel band if a frequency range occupied by this interference is not fully within the filter passband. The interference pdf typically becomes closer to Gaussian after filtering, reducing the effectiveness of the downstream non-linear processing. However, different approaches to the design of the filter lead to different shapes of the output interference pdf even if the filter bandwidth stays approximately the same. This pdf shaping can affect the shape and output dynamic range of an optimal or near-optimal robust non-linear input-output characteristic $f_{env}(x)$ of the downstream non-linear block 756, which in turn influences the complexity and cost of the receiver. This influence is can disproportionately affect short-tail interference.

Figure 9:
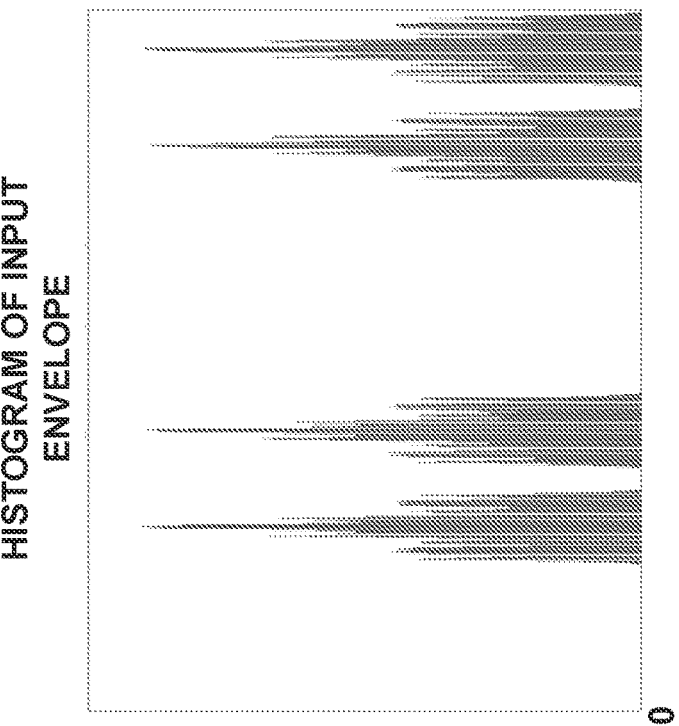
FIG. 9 shows pdf of the envelope of the same interference filtered by a Blackman-Harris window-based FIR filter of the same order designed to pre-condition interference for mitigation.

For example, filtering a low-PAPR matched spectrum interference with an equi-ripple FIR filter typically results in a poorly structured pdf shape that can usually be mitigated by a complicated nonlinearity, often with high output dynamic range. However, filtering the low-PAPR matched spectrum interference with a FIR filter based on a window with a simple spectral composition (such as Hann, Hamming, Blackman, and Blackman-Harris window) can result in a well-structured pdf shape with a few distinct peaks. Such a pdf requires a simpler nonlinearity with low output dynamic range for good interference mitigation. The same can be said about the pdf of the interference envelope. This statement is illustrated by FIGS. 8 and 9.

Figure 8:
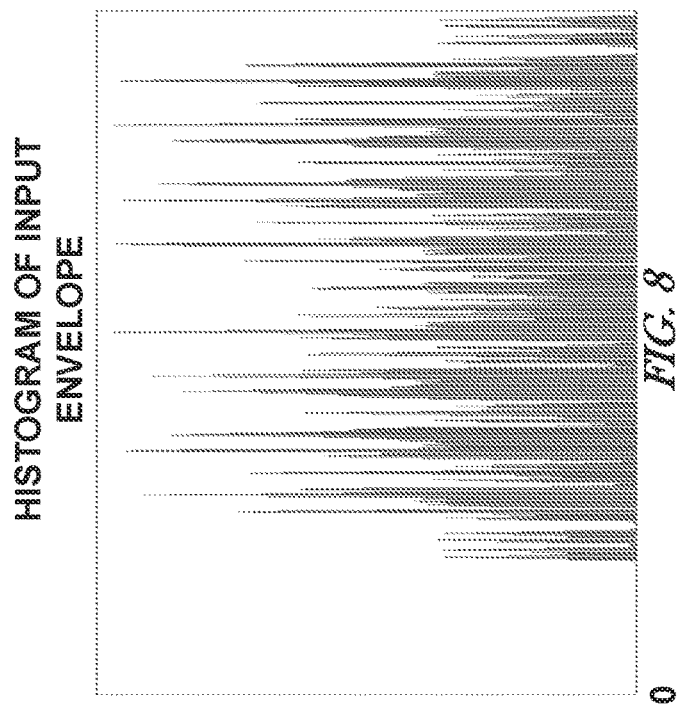
FIG. 8 shows pdf of the envelope of a low peak-to-average power ratio (PAPR) matched spectrum interference filtered by an equiripple FIR filter not designed to pre-condition interference for mitigation.

FIG. 8 shows the pdf of the magnitude (envelope) of a low-PAPR matched spectrum interference filtered by an equiripple FIR filter. FIG. 9 shows the pdf of the magnitude (envelope) of the same interference filtered by a FIR filter of the same order based on a Blackman-Harris window.

The interference analyzer 750 can estimate statistical characteristics of the interference, such as to classify the pdf of the interference. The statistical characteristics can be used to select a non-linearity to be used for interference mitigation. Since the interference mitigation is considered here for the case when the interference is the dominant component of the input signal, the interference analyzer 750 can estimate statistical characteristics of the input signal 744. The interference analyzer 750 can read complex-valued samples of signal 748, as well as samples of its envelope 762. Additionally, if the filter 746 has programmable coefficients, the interference analyzer 750 can optionally read complex-valued samples of signal 744. In principle, just the knowledge of standard deviation a and kurtosis k of interference in any quadrature (in practice, I and Q components generally have the same statistical characteristics) can provide some useful actionable information.

Power of signal 748 in a quadrature (I and/or Q) can be estimated as $\sigma^2$. The total power of signal 748 is $\sigma_{total}^2 = 2\sigma^2$, and its total root mean square (rms) value is $\sigma_{total}^2 = \sqrt{2}\sigma$. These values are corrected for automatic gain control (AGC) attenuation to exclude the AGC influence. They can be used to report interference power, initiate interference mitigation, scale mitigation parameters, estimate kurtosis, or a combination thereof.

Kurtosis is a fourth central moment of a distribution divided by the standard deviation of that distribution. In mathematical terms, kurtosis of interference in a quadrature is defined as $k=\mu_4/\sigma^4$, where $\mu_4$ is the $4^{th}$ central moment of interference in a quadrature. Kurtosis indicates whether pdf is short-tail (k<3), Gaussian (k=3), or long-tail (k>3). That classification would allow coarse selection of a robust non-linearity that could improve SNR. Knowledge of $\sigma$ would allow proper scaling of this non-linearity. Of course, using only $\sigma$ and k permits only crude classification and mitigation of interference, and more characteristics can be calculated for better results.

Estimating the pdf of the interference magnitude (envelope) by building its histogram significantly increases the amount information available for classification and mitigation of interference. The amount of histogram bins depends on the available resources, but even a small amount of bins (e.g., 10 or so) can provide a lot of useful information. Increasing the number of bins would further increase classification accuracy and improve interference mitigation.

For example, the use of kurtosis alone can be sufficient to reliably distinguish between Gaussian and some cases of short-tail (e.g., significantly truncated Gaussian) interference or long-tail (e.g., pulsed) interference. However, differentiating between Gaussian and some other types of short-tail interference is more problematic. For example, prior filtering can increase kurtosis of low-PAPR matched spectrum interference and make it very close to 3.

The interference analyzer 750 can use another distinguishing property of low-PAPR interference distorted by optimized pdf shaping filter 746 if its pdf is multi-modal (unlike Gaussian pdf). The same can be said about the pdf of the interference envelope (see, for example, FIG. 9). Detecting this property is automated by estimating the pdf derivative and counting the number of its zero-crossings. To this end, the interference analyzer 750 can estimate an interference envelope pdf and its derivative as follows:

(a) interference envelope pdf $p_{env}(x)$ can be estimated by building a histogram using a programmable number of thresholds with crossing counters (b) derivative $p_{env}'(x)$ of pdf $p_{env}(x)$ can be estimated by calculating differences between directly adjacent histogram bins.

(c) statistical estimates performed by interference analyzer are corrected for AGC attenuation to exclude AGC influence.

To estimate statistical dependence between interference samples, the interference analyzer can further estimate the values of the autocorrelation function of the signal 748 in two or more time instances in the vicinity of zero time offset. To find the autocorrelation function value at the distance of m sampling intervals from zero, the autocorrelation function can multiply each complex-valued sample $u_n$ of signal 748 by the delayed complex conjugate sample $u_{n-m}*$ and average the result. The value(s) of m can be selected based on the sampling rate and bandwidth of the FDMA frequency channel. The autocorrelation function value for m=0 can be equal to $\sigma_{total}^2$ and therefore does not have to be calculated again.

An autocorrelation output whose absolute value is "sharp" in the vicinity of m=0 indicates wideband interference, an autocorrelation output with a "flat" absolute value near zero indicates narrowband interference, and a result between these two extremes can indicate either partial-band interference or multiple narrowband interference.

Interference analyzer 750 can periodically update its estimates of the statistical characteristics of interference. The update period depends of the available resources as well as the stationarity interval of the interference. Therefore, in some teachings the update period can be variable and set by the unit controller 752.

The unit controller 752 can determine whether to activate interference mitigation in non-linear block 756. The unit controller 752 can select the non-linearity $f_{env}(x)$ for the interference mitigation. These decisions can be made based on the statistical characteristics of interference obtained from interference analyzer 750.

The unit controller 752 can determine whether to activate interference mitigation in non-linear module 756 based on a specified criterion. The criterion can include: a ratio $\sigma^2/\sigma_{noise}^2$ exceeding a pre-defined threshold value PwrThr. This can indicate that the interference is non-Gaussian. The value of PwrThr is typically between 6 dB and 12 dB depending on the application and scenario. In some teachings, interference mitigation can also be activated for narrowband Gaussian and partial band Gaussian interference (see below) if $\sigma_{total}^2/\sigma_{noise}^2 > $ PwrThr. In these cases, unit controller 752 can use a demultiplexer 754 to route signal 748 to non-linear module 756. Otherwise, signal 748 can be routed to matching delay block 758 whose delay is equal to the group delay of non-linear block 756.

As mentioned above, the optimal non-linearity $f_{env}(x)$ for the envelope of non-Gaussian interference can be calculated based on the estimated envelope pdf $p_{env}(x)$ and its derivative $p_{env}'(x)$. While in some cases such optimal non-linearity can be used directly, in other cases it is not robust, or is problematic to implement. In such cases, it is beneficial to use a similar but more robust and/or simpler non-linear function that has slightly less than optimal performance for the estimated $p_{env}(x)$. The selection algorithm implemented in unit controller 752 selects proper $f_{env}(x)$ to balance optimality, robustness, flexibility, and complexity.

For long-tail interference that is mitigated by a compressing non-linearity, a known low-cost robust approximation of such a non-linearity can be represented by interference limiting. Interference limiting includes assigning a constant value to every envelope sample that exceeds a certain threshold determined by the receiver noise root mean square (rms). If this constant value is equal to zero, the approximation is called interference blanking. In addition to simplicity and robustness, limiting and blanking maintain low output dynamic range of the non-linear block.

Combining simplicity, robustness, and manageable dynamic range can be harder for many types of short-tail interference. In the described interference mitigation unit 720A-720B, a manageable output dynamic range can be realized even for those short-tail interference distributions that typically consume prohibitively large output dynamic range. This can be achieved by modifying a selected robust non-linearity in a piece-wise manner by introducing additional discontinuities at suitable points, akin to how a Fresnel lens uses a flattened structure to emulate a curved surface. Performed properly, such modification reduces complexity and cost of the receiver.

Figure 10:
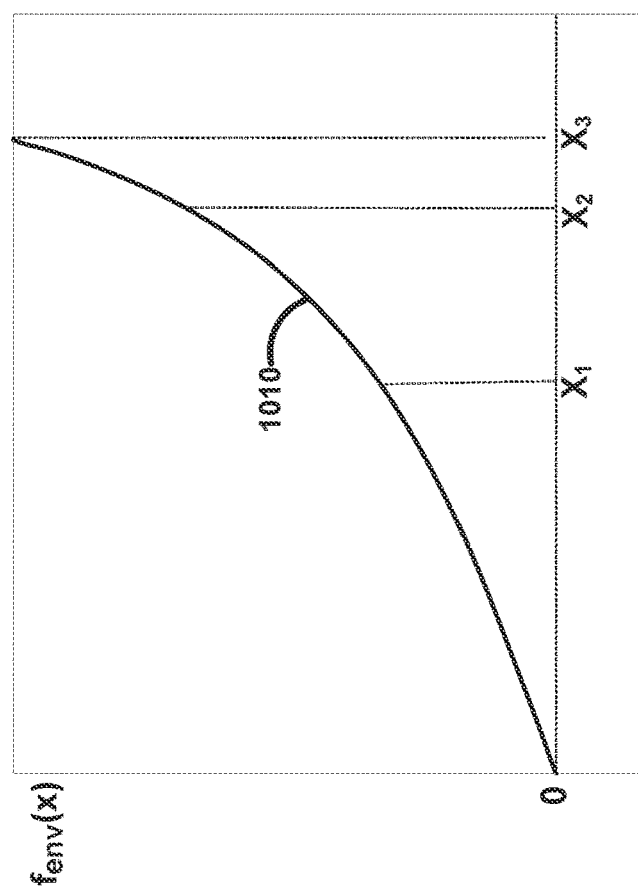
FIG. 10 illustrates, by way of example, a robust non-linearity that can be used for mitigation of short-tail interference.

FIG. 10 illustrates, by way of example, a graph of a robust non-linearity, such as can be applied in the non-linear functional converter 766. The non-linearity can be applied to account for interference with a short tail pdf. The output dynamic range of the optimal non-linearity is very high: the y-value of the line 1010 quickly increases and becomes prohibitively large. The line includes a first section in the interval $[0, x_1)$, a second section in the interval $[x_1, x_2)$, and a third section in the interval $[x_2, x_3]$. The line 1010 is continuous.

Figure 11:
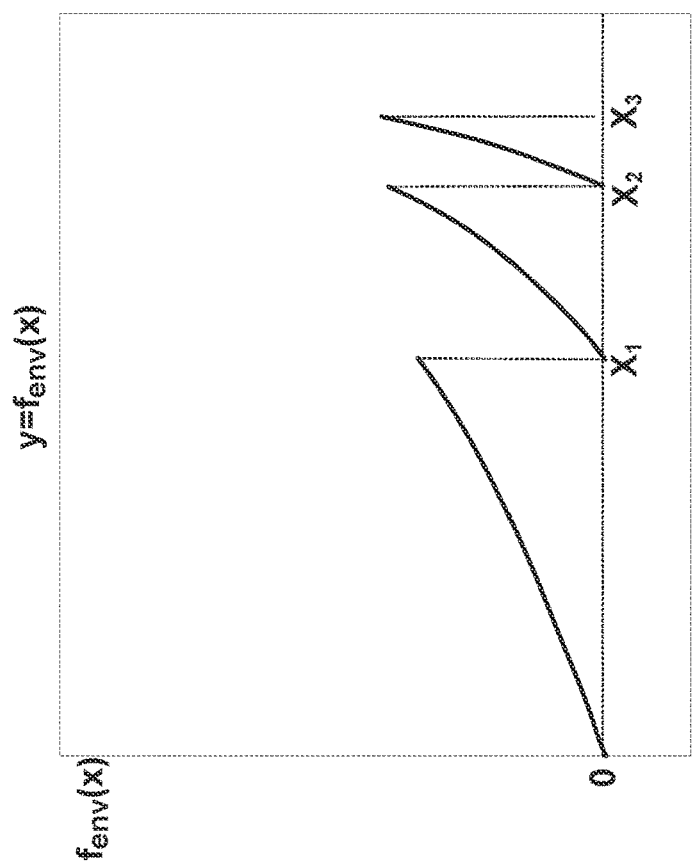
FIG. 11 illustrates, by way of example, the same non-linearity modified in a piece-wise manner to reduce output dynamic range.

FIG. 11 illustrates, by way of example, a graph of this non-linearity modified in a piece-wise manner by introducing discontinuities. The resulting piece-wise non-linearity includes a first section in the interval $[0, x_1)$ that is the same as the original non-linearity illustrated in FIG. 10. The piece-wise non-linearity also includes a second section in the interval $[x_1, x_2)$ that matches the shape of the second section of the line 1010 but is offset. Offsetting the second section can help reduce the output dynamic range of the piece-wise non-linearity of FIG. 11. The offset can be determined by the values of estimated pdf $p_{env}(x)$ and its derivative $p_{env}'(x)$ in the given interval). A suboptimal alternative is such that a lowest $|f_{env}(x)|$ value in the interval maps to y=0.

The piece-wise non-linearity of FIG. 11 further includes a third section in the interval $[x_2, x_3]$ that matches the shape of the third section of the line 1010 but is offset such that $f_{env}(x_2)=0$. The size of each section of the piece-wise non-linearity can be set such that the output dynamic range remains between a user-specified minimum $f_{env}(x)$ and maximum $f_{env}(x)$.

The described piece-wise modification thus provides a "flatter" non-linearity than the "conventional" robust non-linearity in a manner similar to how a Fresnel lens emulates a curved lens by using a series of flatter sections. This non-linearity can thus be used to control the output dynamic range.

Figure 12:
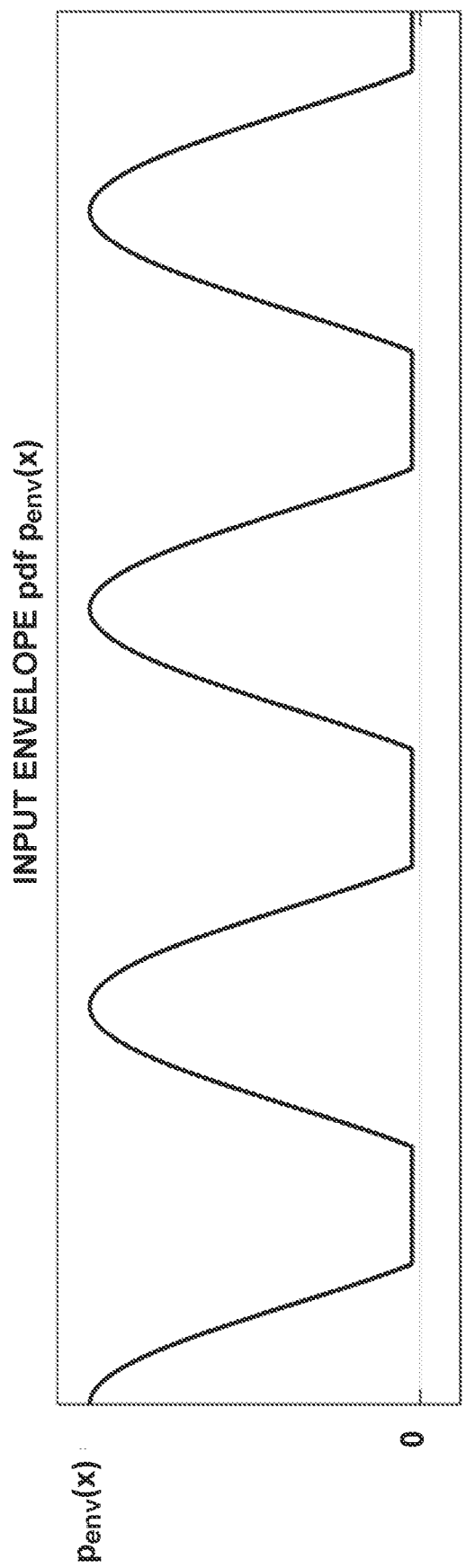
FIG. 12 illustrates, by way of example, a pdf of the envelope of another pre-conditioned interference signal.
Figure 13:
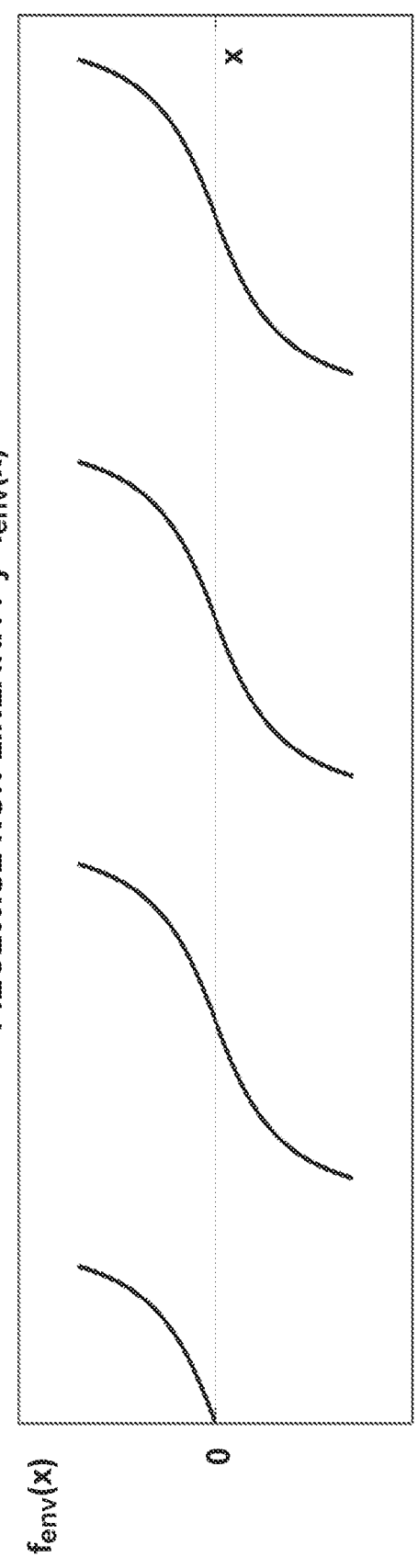
FIG. 13 illustrates, by way of example, a graph of a piece-wise non-linearity that can be applied to mitigate the interference.

FIG. 12 illustrates, by way of example, a stylized graph of the envelope pdf of another low-PAPR matched spectrum interference signal pre-conditioned by a pdf shaping filter for interference mitigation. FIG. 13 illustrates, by way of example, a graph of a piece-wise non-linearity that can be applied to the pre-conditioned interference of FIG. 12 to mitigate that interference. The piece-wise non-linearity of FIG. 13 includes a repeating pattern that can simplify implementation.

The purpose of non-linear functional converter 766 is realization and application of non-linearity $f_{env}(x)$ programmed by unit controller 752. The non-linearity can be realized in various ways, including lookup table or approximation by simpler functions, such as stepwise, piece-wise linear, polynomial, and spline approximation, approximation by trigonometric or hyperbolic functions, etc. Using combinations of several aforementioned methods at the same time or at different times is also possible. Note that fast updates of the non-linearity parameters are easier to execute using simpler realizations (and therefore cruder approximations) of the non-linearity. This can matter if the interference has a short stationarity interval, i.e. its statistics change often. If the interference has long stationarity interval, more elaborate realizations of the non-linearity are possible.

Since interference changes over time, the control path "interference analyzer→unit controller→non-linear module" can be updated with period $T_{ctrl}$ that is less than the stationarity interval of interference. This is usually not a problem for interference with stationarity interval duration of multiple seconds or longer. However, short stationarity intervals (tens of milliseconds or shorter) may not allow proper adaptation of an interference mitigation unit due to throughput limitations. In this case, it can be beneficial to have two types of updates in the control path: "regular" and "fast". During "fast" update, only the estimated rms value of interference is updated and used to control only scaling of the non-linearity $f_{env}(x)$ along the x axis, with its other parameters staying the same. This would allow "regular" updates to happen at a much lower rate.

While the described non-linear processing is not beneficial for mitigation of wideband Gaussian interference, it can help mitigate Gaussian interference whose bandwidth $B_{int}$ is narrower than that of the desired signal(s). Such mitigation can include performing "fast" updates with period $T_{ctrl\ fast} \ll 1/B_{int}$, so that the interference looks slowly-changing (i.e. non-Gaussian) between the "fast" update periods.

Figure 14:
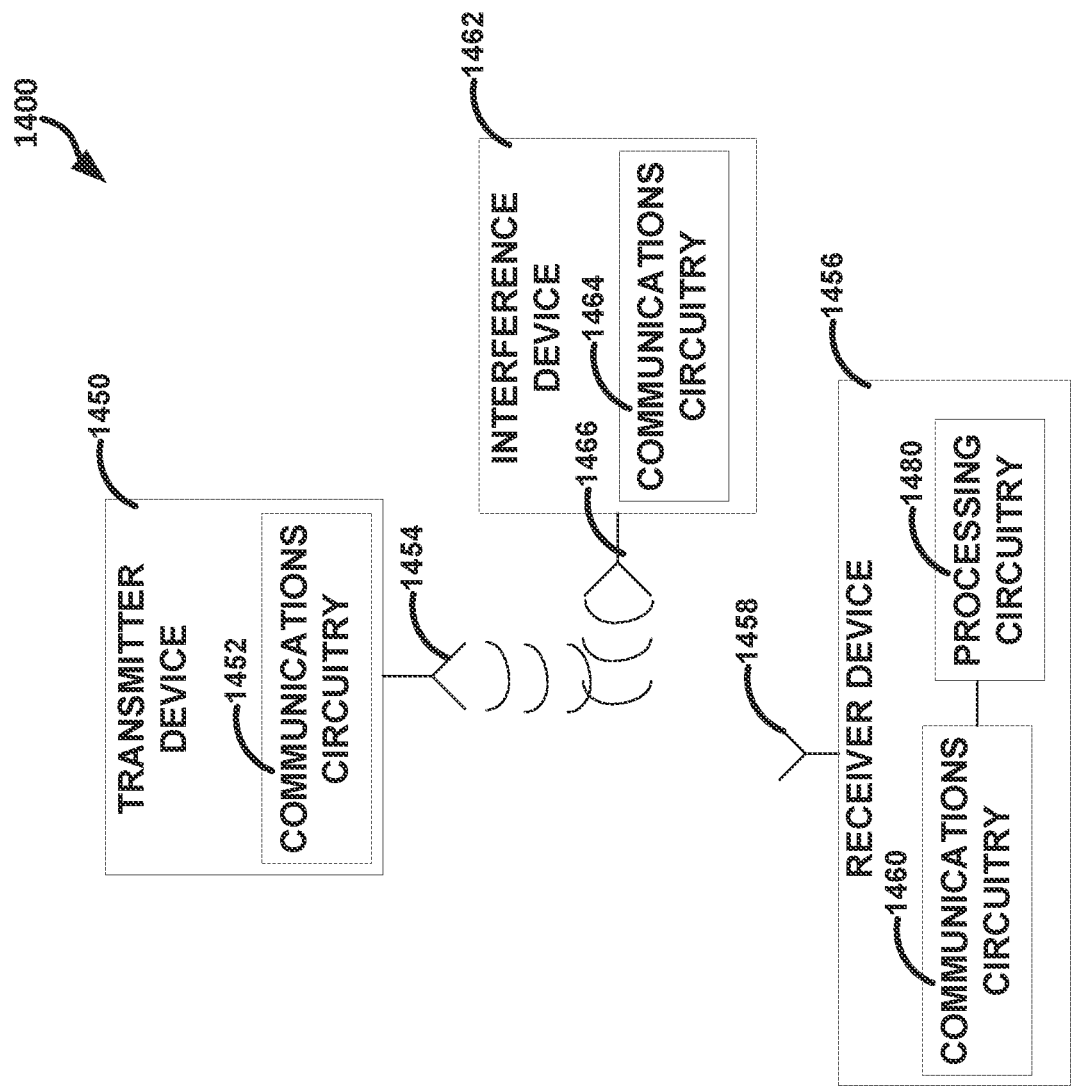
FIG. 14 illustrates, by way of example, a diagram of a system for interference mitigation in an SS receiver.

FIG. 14 illustrates, by way of example, a diagram of an embodiment of a system 1400 that can use teachings of this disclosure. The system 1400 includes a transmitter device 1450 and a receiver device 1456. An interference device 1462 emits a signal that alters a transmission from the transmitter device 1450.

The transmitting device 1450 can be a radio or acoustic SS signal transmitter or the like. The receiver device 1456 can include any device with an antenna 1458 that is configured to receive a transmission from an antenna 1454 of the transmitter device 1450. The interference device 1462 can include any device with an antenna 1466 that is configured to emit a waveform that is configured to interfere with the transmission from the antenna 1454.

Each of the transmitter device 1450, receiver device 1456, and interference device 1462 can include communications circuitry 1452, 1460, 1464, respectively. The communications circuitry 1452, 1460, 1464 can include electric or electronic components configured to provide a signal to the antenna 1454, 1458, 1466. The electric or electronic components can include one or more resistors, transistors, capacitors, diodes, inductors, modulators, demodulators, amplifiers, phase-locked-loops (PLLs), frequency filters, processing units (e.g., a central processing unit (CPU), application specific integrated circuit (ASIC), field programmable gate array (FPGA), graphics processing unit (GPU), or the like). The communications circuitry 1452 can include a processing unit that implements a spreading function to spread the transmission from the antenna 1454 in frequency. The communications circuitry 1460 can include one or components of the system 1400 or the system 700.

The receiver device 1456 can receive, at the antenna 1458, a signal that includes a combination of transmissions from the antennas 1454, 1466. The receiver device 1456 can, by the processing circuitry 1602 and the communications circuitry 1460, mitigate interference from the interference device 1462. The interference mitigation can control an output dynamic range of the receiver device 1456.

Figure 15:
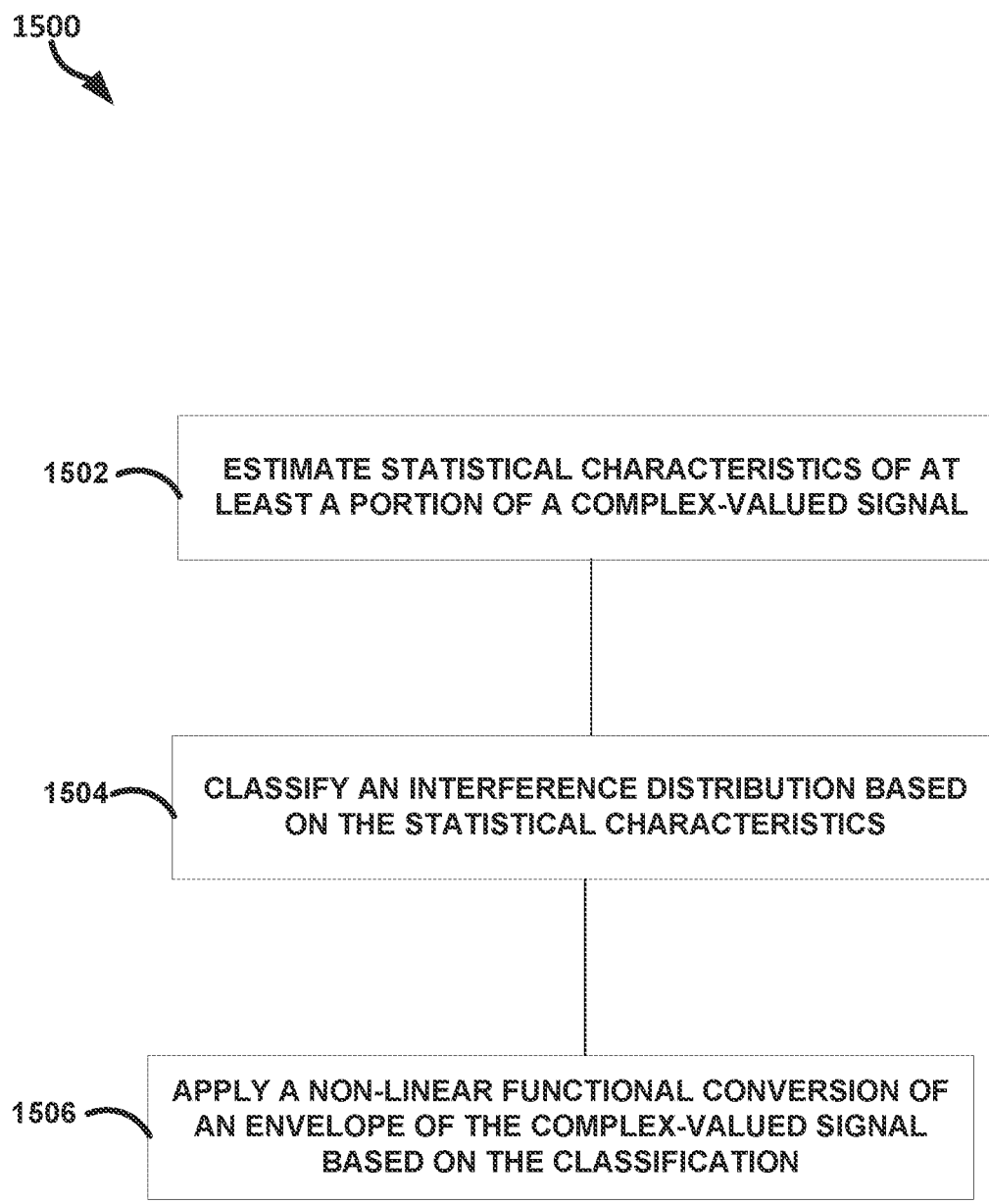
FIG. 15 illustrates, by way of example, a diagram of a method for adaptive interference mitigation in an SS receiver.

FIG. 15 illustrates, by way of example, a diagram of an embodiment of a method 1500 for SS receiver interference mitigation. The method 1500 as illustrated includes estimating statistical characteristics of at least a portion of a complex-valued signal, at operation 1502; classifying an interference distribution based on the statistical characteristics, at operation 1504; and applying a non-linear functional conversion of an envelope of the complex-valued signal based on the classification.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus (e.g., a programmable processor, a computer, or multiple computers).

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 16:
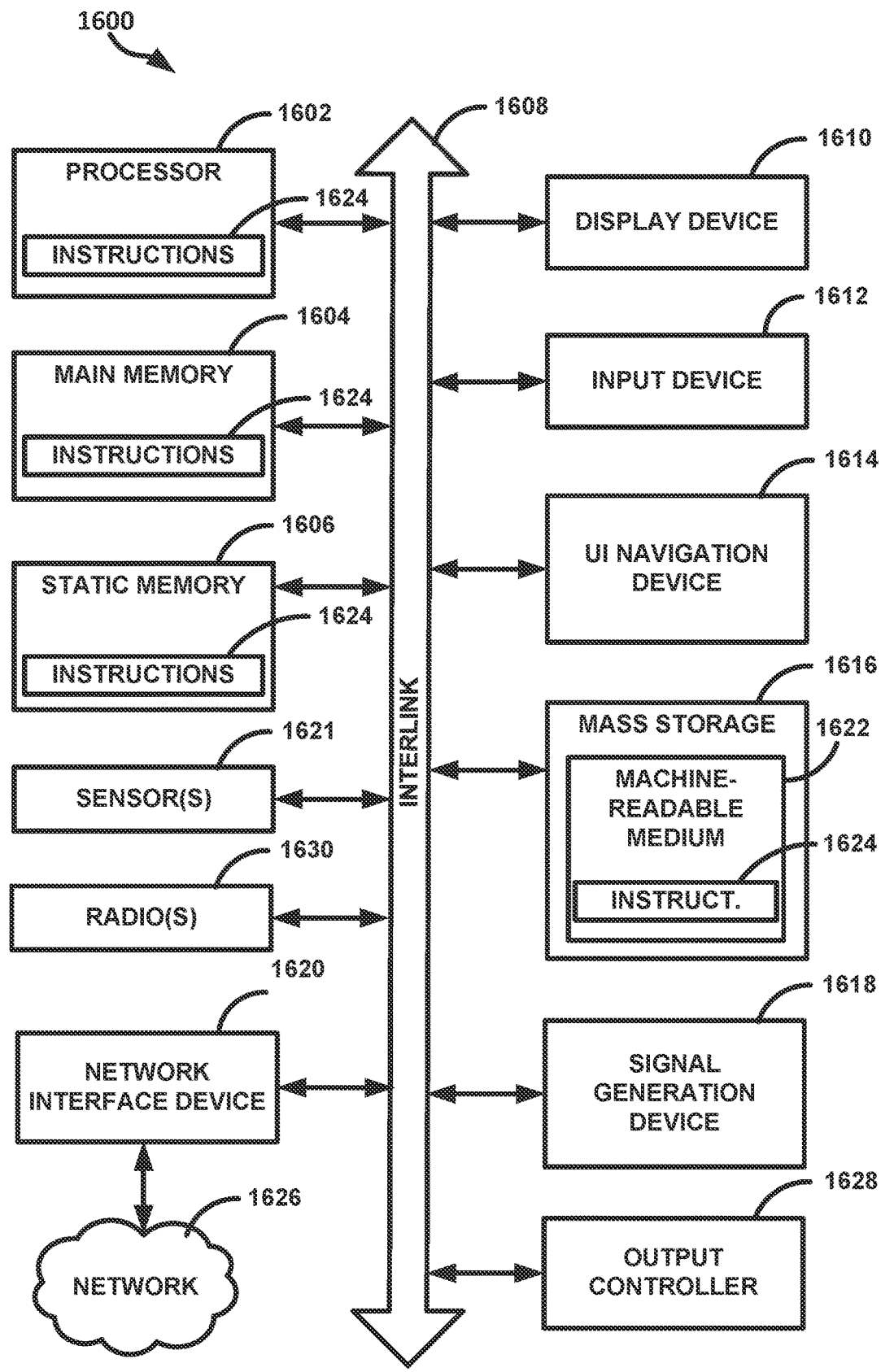
FIG. 16 illustrates, by way of example, a block diagram of an embodiment of a machine (e.g., a computer system) to implement one or more embodiments.

FIG. 16 illustrates, by way of example, a block diagram of an embodiment of a machine in the example form of a computer system 1600 within which instructions, for causing the machine to perform any one or more of the methodologies discussed herein, may be executed. One or more of can be implemented or performed by the computer system 1600. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, sensors 1621 (e.g., a transducer that converts one form of energy (e.g., light, heat, electrical, mechanical, or other energy) to another form of energy), such as an IR, SAR, SAS, visible, or other image sensor, or the like, or a combination thereof), or the like, or a combination thereof), a main memory 1604 and a static memory 1606, which communicate with each other via a bus 1608. The memory 1604, 1606 can store parameters (sometimes called weights) that define operations of the processing circuitry 1480 or other component of the system 1400. The computer system 1600 may further include a video display unit 1610 (e.g., a liquid crystal display (LCD) or a cathode ray tube (CRT)). The computer system 1600 also includes an alphanumeric input device 1612 (e.g., a keyboard), a user interface (UI) navigation device 1614 (e.g., a mouse), a disk drive unit 1616, a signal generation device 1618 (e.g., a speaker), a network interface device 1620, and radios 1630 such as Bluetooth, WWAN, WLAN, and NFC, permitting the application of security controls on such protocols.

The machine 1600 as illustrated includes an output controller 1628. The output controller 1628 manages data flow to/from the machine 1600. The output controller 1628 is sometimes called a device controller, with software that directly interacts with the output controller 1628 being called a device driver.

Machine-Readable Medium

The disk drive unit 1616 includes a machine-readable medium 1622 on which is stored one or more sets of instructions and data structures (e.g., software) 1624 embodying or utilized by any one or more of the methodologies or functions described herein. The instructions 1624 may also reside, completely or at least partially, within the main memory 1604, the static memory 1606, and/or within the processor 1602 during execution thereof by the computer system 1600, the main memory 1604 and the processor 1602 also constituting machine-readable media.

While the machine-readable medium 1622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1624 may further be transmitted or received over a communications network 1626 using a transmission medium. The instructions 1624 may be transmitted using the network interface device 1620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Although teachings have been described with reference to specific example teachings, it will be evident that various modifications and changes may be made to these teachings without departing from the broader spirit and scope of the teachings. Accordingly, the specification and drawings are to be regarded in an illustrative rather than a restrictive sense. The accompanying drawings that form a part hereof, show by way of illustration, and not of limitation, specific teachings in which the subject matter may be practiced. The teachings illustrated are described in sufficient detail to enable those skilled in the art to practice the teachings disclosed herein. Other teachings may be utilized and derived therefrom, such that structural and logical substitutions and changes may be made without departing from the scope of this disclosure. This Detailed Description, therefore, is not to be taken in a limiting sense, and the scope of various teachings is defined only by the appended claims, along with the full range of equivalents to which such claims are entitled.

What is claimed is:

1. An interference mitigation unit comprising:
    an interference analyzer that receives a complex-valued signal and estimates statistical characteristics of at least a portion of the complex-valued signal;
    a unit controller that receives the estimated statistical characteristics from the interference analyzer, classifies the interference distribution based on statistical characteristics as a Gaussian, long-tail, or short-tail, selects a non-linearity for that distribution; and
    a programmable non-linear module that performs a non-linear functional conversion of an envelope of the received complex-valued signal using a non-linear input-output characteristic based on the classification by the unit controller.

2. The interference mitigation unit of claim 1, wherein a dominant component of the complex-valued signal is interference.

3. The interference mitigation unit of claim 1, wherein the estimated statistical characteristics include standard deviation and kurtosis.

4. The interference mitigation unit of claim 1, wherein the non-linear module scales the non-linearity proportionally to a root mean square (rms) value of the interference.

5. The interference mitigation unit of claim 1, wherein the non-linear module, performs a piece-wise modification of the non-linearity that reduces an output dynamic range of the non-linearity.

6. The interference mitigation unit of claim 1, wherein the interference analyzer further estimates a probability density function (pdf) of the interference envelope by calculating a histogram of the interference.

7. The interference mitigation unit of claim 6, wherein the unit controller estimates a derivative of the pdf by calculating differences between adjacent bins of the histogram and uses the number and positions of zero-crossings to classify the pdf and select the non-linearity to apply to the complex-valued signal.

8. The interference mitigation unit of claim 7, wherein the interference analyzer determines the positions of piece-wise discontinuities of the non-linearity based on the zero-crossings of the estimated envelope pdf derivative and types of pdf critical points at these zero-crossings.

9. The interference mitigation unit of claim 8, wherein the unit controller further performs piece-wise modification of the non-linearity by introducing discontinuities at one or more of the estimated zero-crossings.

10. The interference mitigation unit of claim 1, further comprising a pdf shaping filter that modifies the pdf of the interference to enhance mitigation of the interference with a piece-wise non-linearity.

11. The interference mitigation unit of claim 1, wherein the interference analyzer further estimates values of the autocorrelation function of the input signal in two or more time instances and provides the results to the controller and the controller classifies the interference as narrowband, partial band, or wideband based on the autocorrelation function values.

12. The interference mitigation unit of claim 1, wherein the interference analyzer, unit controller, and non-linear module are updated periodically with a time interval $T_{ctrl}$, that is less than a stationarity interval of the interference.

13. The interference mitigation unit of claim 1, wherein the interference analyzer, unit controller, and non-linear module updates with a first period $T_{ctrl\ fast}$, in which only an estimated root mean square (rms) value of interference is updated and used to control only scaling of the non-linearity $f_{env}(x)$ along the x axis, with other parameters staying the same.

14. The interference mitigation unit of claim 13, that further mitigates Gaussian interference whose bandwidth $B_{int}$ is narrower than that of the desired signal(s) by performing updates with period $T_{ctrl\ fast} \ll 1/B_{int}$.

15. An interference mitigation method comprising:
    receiving, by an interference analyzer, a complex-valued signal;
    estimating, by the interference analyzer, statistical characteristics of at least a portion of the complex-valued signal;
    receiving, by a unit controller, the estimated statistical characteristics from the interference analyzer;
    classifying, by the unit controller, the interference distribution based on statistical characteristics as a Gaussian, long-tail, or short-tail, selects a non-linearity for that distribution;
    and
    performing, by a programmable non-linear module, a non-linear functional conversion of an envelope of the received complex-valued signal using a non-linear input-output characteristic based on the classification by the unit controller.

16. The method of claim 15, further comprising passing the input signal through a pdf shaping filter resulting in a shaped input signal.

17. The method of claim 16, further comprising modifying, in a piece-wise manner, the shaped input signal to reduce an output dynamic range of the shaped input signal.

18. The method of claim 17, wherein the estimated statistical characteristics include standard deviation and kurtosis.

19. A non-transitory machine-readable medium including instructions that, when executed by an interference mitigation unit, cause the interference mitigation unit to perform operations comprising:
   receiving a complex-valued signal;
   estimating statistical characteristics of at least a portion of the complex-valued signal;
   receiving the estimated statistical characteristics from the interference analyzer;
   classifying the interference distribution based on statistical characteristics as a Gaussian, long-tail, or short-tail, selects a non-linearity for that distribution; and
   performing a non-linear functional conversion of an envelope of the received complex-valued signal using a non-linear input-output characteristic based on the classification by the unit controller.

20. The non-transitory machine-readable medium of claim 19, further comprising:
   performing a piece-wise modification of the non-linearity that reduces an output dynamic range of the non-linearity by:
   estimating a probability density function (pdf) of the interference envelope by calculating a histogram of the interference;
   estimating a derivative of the pdf by calculating differences between adjacent histogram bins of the histogram;
   estimating positions of piece-wise discontinuities of the piece-wise modification by finding zero-crossings of the estimated envelope pdf derivative; and
   using the number and positions of the zero-crossings to classify the pdf and select the non-linearity to apply to the complex-valued signal.

* * * * *